(12) United States Patent
Walker, Jr. et al.

(10) Patent No.: US 8,343,624 B2
(45) Date of Patent: Jan. 1, 2013

(54) DURABLE ANTIREFLECTIVE FILM

(75) Inventors: Christopher B. Walker, Jr., St. Paul, MN (US); Marc D. Radcliffe, Newport, MN (US); Thomas P. Klun, Lakeland, MN (US); Lan H. Liu, Rosemount, MN (US); Richard J. Pokorny, Maplewood, MN (US); William D. Coggio, Hudson, WI (US); Chuntao Cao, Woodbury, MN (US); Mark J. Pellerite, Woodbury, MN (US); Paul C. Kelley, Eagan, MN (US); Robert J. Fleming, San Jose, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/365,313

(22) Filed: Feb. 3, 2012

(65) Prior Publication Data

US 2012/0135210 A1    May 31, 2012

Related U.S. Application Data (63) Continuation of application No. 12/304,505, filed as application No. PCT/US2007/070465 on Jun. 6, 2007, now Pat. No. 8,137,801, which is a continuation of application No. 11/427,055, filed on Jun. 28, 2006, now abandoned, and a continuation-in-part of application No. 11/423,781, filed on Jun. 13, 2006, now abandoned.

(51) Int. Cl.
*B32B 27/36* (2006.01)
*B32B 5/16* (2006.01)

(52) U.S. Cl. ........ 428/323; 428/212; 428/327; 359/586; 977/773; 977/902

(58) Field of Classification Search .................. 359/586; 428/212; 977/773, 902
See application file for complete search history.

(56) References Cited

U.S. PATENT DOCUMENTS

| | | | |
|---|---|---|---|
| 3,810,874 A | 5/1974 | Mitsch et al. | |
| 3,833,368 A | 9/1974 | Land et al. | |
| 6,343,865 B1 | 2/2002 | Suzuki | |
| 6,893,245 B2 | 5/2005 | Foreman et al. | |
| 6,972,065 B1 | 12/2005 | Arnold | |
| 2001/0050741 A1 | 12/2001 | Hokazono et al. | |
| 2003/0049343 A1 | 3/2003 | Foreman et al. | |
| 2003/0120008 A1 | 6/2003 | Obayashi et al. | |
| 2004/0114248 A1 | 6/2004 | Hokazono et al. | |
| 2005/0182199 A1 | 8/2005 | Jing et al. | |
| 2005/0249940 A1 | 11/2005 | Klun et al. | |
| 2006/0123915 A1 | 6/2006 | Arnold | |
| 2006/0147723 A1 | 7/2006 | Jing et al. | |
| 2007/0066703 A1 | 3/2007 | Shinohara et al. | |
| 2007/0206286 A1 | 9/2007 | Fukushige | |
| 2010/0232021 A1 | 9/2010 | Walker, Jr. | |

FOREIGN PATENT DOCUMENTS

| | | |
|---|---|---|
| EM | 0632059 | 4/1995 |
| EP | 0 863 128 | 9/1998 |
| EP | 1 279 443 | 1/2003 |
| EP | 1 460 091 | 9/2004 |
| JP | 6-136062 | 5/1994 |
| JP | 6-211945 | 8/1994 |
| JP | 11-2702 | 1/1999 |
| JP | 2000-301053 | 10/2000 |
| JP | 2002-332313 | 11/2002 |
| JP | 2003-183332 | 7/2003 |
| JP | 2003-292826 | 10/2003 |
| JP | 2004-122611 | 4/2004 |
| JP | 2006-047504 | 2/2006 |
| WO | WO 2006/030721 | 3/2006 |
| WO | WO 2006/073867 | 7/2006 |

OTHER PUBLICATIONS

Macromolecules 1991, 24, 3434-3442; Properties of Fractal Divinylbenzene Microgels, Antonietti et al.
Solvay Solexis, Fomblin Z Drivatives Product Data Sheet, (2002) 1 page.

*Primary Examiner* — Terressa Boykin
(74) *Attorney, Agent, or Firm* — Carolyn A. Fischer

(57) ABSTRACT

Antireflective films are described having a surface layer comprising a the reaction product of a polymerizable low refractive index composition comprising at least one free-radically polymerizable fluoropolymer and surface modified inorganic nanoparticles. A high refractive index layer is coupled to the low refractive index layer. In one embodiment, the high refractive index layer comprises surface modified inorganic nanoparticles dispersed in a crosslinked organic material. The antireflective film is preferably durable, exhibiting a haze of less than 1.0% after 25 wipes with steel wool using a 3.2 cm mandrel and a mass of 1000 grams.

22 Claims, 1 Drawing Sheet

DURABLE ANTIREFLECTIVE FILM

RELATED APPLICATION DATA

This is a continuation of application Ser. No. 12/304,505, filed Dec. 12, 2008 now U.S. Pat. No. 8,137,801; which is a national stage filing under 35 U.S.C. 371 of PCT/US2007/070465 filed Jun. 6, 2007, which International Application published by the International Bureau in English on Dec. 21, 2007, which is a continuation-in-part of U.S. application Ser. No. 11/423,781, filed Jun. 13, 2006, and is a continuation-in-part of U.S. application Ser. No. 11/427,055 (published as US2007/0286994), filed Jun. 28, 2006, the disclosures of which are incorporated by reference in their entirety herein.

BACKGROUND

Various antireflective polymer films ("AR films") have been described. The physical principles by which anti-reflection films and coatings function are well known. Several overviews can be found, for example, in *Optical Engineering*, S. Muskiant Ed, Vol. 6., *Optical Materials*, Chap. 7, p 161, 1985 and as shown in U.S. Pat. No. 3,833,368 to Land, et al. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range (e.g. 2.5% or lower).

As described in Groh and Zimmerman, *Macromolecules*, Vol. 24 p. 6660 (1991), it is known that fluorine containing materials inherently have a low refractive index and are therefore useful in the low refractive index layer of AR films.

AR coatings using fluoro(meth)acrylate polymers and fluorine containing materials have also been described.

Although increased fluorine content decreases the refractive index of the low refractive index coating composition, the concurrent decrease in surface energy can result in poor coating and optical cosmetic properties as well as a loss in interfacial adhesion with the adjacent high refractive index layer. Also, highly fluorinated materials have been known to reduce the hardness and durability of the coating.

SUMMARY OF THE INVENTION

Durable antireflective films are described comprising a low refractive index layer and a high refractive index layer coupled to the low refractive index layer. The low refractive index layer comprises the reaction product of a polymerizable composition comprising at least one fluorinated free-radically polymerizable material and surface modified inorganic nanoparticles. The high refractive index layer preferably has a thickness of about 1 microns to about 10 microns. In one aspect, the high refractive index layer comprises surface modified inorganic nanoparticles dispersed in a crosslinked organic material. In other aspects, the high refractive index layer is an (e.g. sputter coated) inorganic material.

In one embodiment, the antireflective film surface exhibits a haze of less than 1.0% after 25 wipes with steel wool using a 3.2 cm mandrel and a mass of 1000 grams.

The high refractive index layer preferably has a refractive index of at least 1.60 and preferably comprises 15 vol-% to 40 vol % surface modified zirconia nanoparticles. The surface modified nanoparticles preferably comprise free-radically polymerizable groups.

The low refractive index composition typically comprises one or more fluorinated free-radically polymerizable monomers, oligomers, polymers, and mixtures thereof, having a fluorine content of at least 25 wt-%. The proportion of such material in the low refractive index layer is typically at least 25 wt-% or greater. The fluorinated free-radically polymerizable material is preferably multi-functional. The low refractive index layer composition typically further comprises at least one non-fluorinated crosslinker having at least three multi-acrylate groups. In preferred embodiments, the fluorinated free-radically polymerizable material comprises at least one fluoropolymer.

In one embodiment, the low refractive index layer comprises the reaction product of a polymerizable composition comprising a free-radically polymerizable fluorinated polymeric intermediate, at least one fluorinated free-radically polymerizable (e.g. monomeric and/or oligomeric) material; and the surface modified inorganic nanoparticles.

In another embodiment, the low refractive index layer comprises the reaction product of a polymerizable composition comprising at least one free-radically polymerizable fluoropolymer, at least one amino organosilane ester coupling agent or condensation product thereof, at least one non-fluorinated crosslinker having at least three free-radically polymerizable groups; and the surface modified inorganic nanoparticles.

In each of these embodiments, the low refractive index layer is preferably cured by exposure to (e.g. UV) radiation to crosslink the free-radically polymerizable moieties. The low refractive index layer has an optical thickness of about ¼ wave. Durable antireflective films can be obtained in the absence of (e.g. matte) inorganic particles having a diameter of greater than 1 micron. The antireflective films described herein may be provided as a film article comprising a (e.g. high refractive index) light transmissive substrate underlying the high refractive index layer. Alternatively, the combination of high refractive index layer and low refractive index layer may be applied directly to a (e.g. display) surface. The substrate to which the high refractive index layer is applied may optionally include a (e.g. high refractive index) primer that may optionally include antistatic particles.

DETAILED DESCRIPTION OF PREFERRED EMBODIMENTS OF THE INVENTION

The recitation of numerical ranges by endpoints includes all numbers subsumed within the range (e.g. the range 1 to 10 includes 1, 1.5, 3.33, and 10).

The phrase "free-radically polymerizable" refers to monomers, oligomers, and polymers having functional groups that participate in crosslinking reactions upon exposure to a suitable source of free radicals. Free-radically polymerizable groups include for example (meth)acryl groups, —SH, allyl, or vinyl. The free-radically polymerizable group may be halogenated with for example fluorine such as in the case of —COCF=$CH_2$.

Preferred free-radically polymerizable monomer and oligomers typically comprise one on more "(meth)acryl" groups including (meth)acrylamides, and (meth)acrylates optionally substituted with for example fluorine and sulfur. A preferred (meth)acryl group is acrylate. Multi-(meth)acrylate materials comprise at least two polymerizable (meth)acrylate groups; whereas as mono-(meth)acrylate material has a single (meth) acrylate group. Alternatively, the multi-(meth)acrylate monomer can include two or more (meth)acrylate group at one end of the compound. The free-radically polymerizable fluoropolymers typically comprise functional groups reactive with (meth)acrylate or other (meth)acryl groups.

As used herein, "wt-% solids" refers to the sum of the components with the exception of solvent. In some instances, wt-% solids of the polymerizable organic composition is described, referred to the sum of the components with the exception of solvent and inorganic (e.g. particle) materials.

Presently described are antireflective film articles having a low refractive index (e.g. surface) layer coupled to a high refractive index layer.

The durable antireflective film comprises a relatively thick high refractive index layer in combination with a relatively thin low refractive index layer. The high refractive index layer typically has a thickness of at least 0.5 microns, preferably at least 1 micron, more preferably at least 2 microns. The high refractive index layer typically has a thickness of no greater than 10 microns and more typically no greater than 5 microns. The low refractive index layer has an optical thickness of about ¼ wave. Such thickness is typically less than 0.5 microns, more typically less than about 0.2 microns and often about 90 nm to 110 nm. When a durable high refractive index layer is employed in combination with a durable low refractive index layer, a durable (e.g. two-layer) antireflective film can be provided in the absence of additional hardcoat layers.

The low refractive index layer comprises the reaction product of free-radically polymerizable materials. In preferred embodiments, wherein the high refractive index layer comprises surface modified nanoparticles dispersed in a crosslinked organic material, the high refractive index layer also comprises the reaction product of free-radically polymerizable materials. The free-radically polymerizable material will be described herein with respect to (meth)acrylate materials. However, similar results can be obtained by the use of other free-radically polymerizable groups, as known in the art.

The low refractive index surface layer comprises the reaction product of a polymerizable low refractive index composition comprising at least one fluorinated free-radically polymerizable material and surface modified inorganic nanoparticles. The surface modified particles preferably having a low refractive index (e.g. less than 1.50) dispersed in a free-radically polymerized fluorinated organic material described herein. Various low refractive index inorganic particles are known such as metal oxides, metal nitrides, and metal halides (e.g. fluorides). Preferred low refractive index particles include colloidal silica, magnesium fluoride, and lithium fluoride. Silicas for use in the low refractive index composition are commercially available from Nalco Chemical Co., Naperville, Ill. under the trade designation "Nalco Collodial Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers –130, –150, and –200. Fumed silicas are also commercially available from Cabot Corp., Tuscola, Ill., under the trade designations CAB-O-SPERSE 2095", "CAB-O-SPERSE A105", and "CAB-O-SIL M5".

The fluorinated component(s) of the low refractive index layer provide low surface energy. The surface energy of the low index coating composition can be characterized by various methods such as contact angle and ink repellency. The static contact angle with water of the cured low refractive index layer is typically at least 80°. More preferably, the contact angle is at least 90° and most preferably at least 100°. Alternatively, or in addition thereto, the advancing contact angle with hexadecane is at least 50° and more preferably at least 60°. Low surface energy is amenable to anti-soiling and stain repellent properties as well as rendering the exposed surface easy to clean.

In some embodiments, the antireflective films described herein are durable. In one aspect, the durable antireflective films resist scratching after repeated contact with an abrasive material such as steel wool. The presence of significant scratching can increase the haze of the antireflective film. In one embodiment, the antireflective film has a haze of less than 1.0% after 5, 10, 15, 20, or 25 wipes with steel wool using a 3.2 cm mandrel and a mass of 1000 g, according to the Steel Wool Durability Test as further described in the examples.

Surface layers that resist visible scratching do not necessary retain their low surface energy. In preferred embodiments, the antireflective films also retain low surface energy after repeated contact with an abrasive material such as steel wool. In preferred embodiments, the antireflective film preferably exhibits an advancing contact angle with hexadecane of at least 45°, 50°, or 60° after 5, 10, 15, 20, or 25 wipes with steel wool using a 3.8 cm diameter mandrel and a mass of 1000 grams, according to the Steel Wool Durability Testing. The antireflective film typically also exhibit a static contact angle with water of at least 90°, 95°, or 100° after 10 wipes, 50 wipes, 100 wipes, 200 wipes, or even 300 wipes with steel wool using a 3.8 cm diameter mandrel and a mass of 500 grams.

In some embodiments, durable antireflective films include the low refractive index layer as described herein in combination with a high refractive index layer that consists of a (e.g. single) thin layer of an inorganic material, such as a metal or metal oxide. Such high refractive index coatings are generally deposited by thermal evaporation, sputtering, or other vacuum deposition techniques. Examples of particular metal oxides include for example oxides of aluminum, silicon, tin, titanium, niobium, zinc, zirconium, tantalum, yttrium, cerium, tungsten, bismuth, indium, antimony, and mixtures thereof. A sputtered (e.g. silica) low refractive index inorganic tie layer may be applied to the high refractive index layer prior to application of the fluorine containing low refractive index layer.

The high refractive index layer of the durable antireflective film preferably comprises surface modified nanoparticles (preferably having a high refractive index of at least 1.60) dispersed in a crosslinked organic material. A variety of (e.g. non-fluorinated) free-radically polymerizable monomers, oligomers, polymers, and mixtures thereof can be employed in the organic material of the high refractive index layer. Preferably the organic material of high refractive index layer comprises a non-fluorinated free-radically polymerizable material having three or more (meth)acrylate groups alone or in combination with non-fluorinated monofunctional and/or difunctional materials, such as those subsequently described with respect to the low refractive index layer. Various suitable high refractive index compositions are known such as described in Published U.S. Application Nos. 2006/0147702; 2006/0147703; 2006/0147674; and PCT Publication Nos. WO2006/073755; WO2006/073856 and WO2006/073773. Although fluorine atoms are not preferred for the high index layer, other halogens, such as bromine and iodine are useful, such as brominated (meth)acrylates.

Various high refractive index particles are known including for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Patent Publication No. 2006/0148950 and U.S. Pat. No. 6,376,590.

The concentration of (e.g. inorganic) nanoparticles in the low refractive index layer and/or the high refractive index layer is typically at least 5 vol-%, and preferably at least 15 vol-%. The concentration of inorganic particle is typically no greater than about 50 vol-%, and more preferably no greater than 40 vol-%.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to or concurrent with mixing with the monomers. It is preferred in the case of silanes to react the silanes with the particle or nanoparticle surface before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethyl carbamate, N-(3-triethoxysilylpropyl)methoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety known ways, such as described in previously cited Published U.S. Patent Application No. 2006/0148950 and U.S. Pat. No. 6,376,590.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component of the polymerizable resin and a second amphiphilic modifying agent, such as a polyether silane, that may act as a dispersant. The second modifying agent is preferably a polyalkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The antireflective film may have a gloss or matte surface. Matte antireflective films typically have lower transmission and higher haze values than typical gloss films. For examples the haze is generally at least 5%, 6%, 7%, 8%, 9%, or 10% as measured according to ASTM D1003. Whereas gloss surfaces typically have a gloss of at least 130 as measured according to ASTM D 2457-03 at 60°; matte surfaces have a gloss of less than 120.

The surface can be roughened or textured to provide a matte surface. This can be accomplished in a variety of ways as known in the art including embossing the low refractive index surface together with the underlying layer(s) with a suitable tool that has been bead-blasted or otherwise roughened, as well as by curing the composition against a suitable roughened master as described in U.S. Pat. Nos. 5,175,030 (Lu et al.) and 5,183,597 (Lu).

In yet another aspect, matte antireflective films can be prepared by providing the high refractive index layer and low refractive index (e.g. surface) layer on a matte film substrate. Exemplary matte films are commercially available from U.S.A. Kimoto Tech, Cedartown, Ga. under the trade designation "N4D2A."

Matte low and high refractive index coatings can also be prepared by adding a suitably sized particle filler such as silica sand or glass beads to the composition. Such matte particles are typically substantially larger than the surface modified low refractive index particles. For example the average particle size typically ranges from about 1 to 10 microns. The concentration of such matte particles may range from at least 2 wt-% to about 10 wt-% or greater. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (which also contributes to an increase in haze). However, durable antireflective films can be provided in the absence of such matte particles.

The low refractive index polymerizable composition and organic high refractive index polymerizable composition generally comprise at least one crosslinker having at least three free-radically polymerizable groups. This component is often a non-fluorinated multi-(meth)acrylate monomer. The inclusion of such material contributes to the hardness of the cured compositions.

The low refractive index and organic high refractive index polymerizable compositions typically comprise at least 5 wt-%, or 10 wt-%, or 15 wt-% of crosslinker. The concentration of crosslinker in the low refractive index composition is generally no greater than about 40 wt-%. For preferred embodiments that employ high concentration of inorganic particles, the concentration of crosslinker in the high refractive index composition is generally no greater than about 25 wt-%.

Suitable monomers include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494") dipentaerythritol hexaacrylate, and tris(2-hydroxy ethyl) isocyanurate triacrylate (from Sartomer under the trade designation "SR368"). In some aspects, a hydantoin moiety-containing multi-(meth)acrylates compound, such as described in U.S. Pat. No. 4,262,072 (Wendling et al.) is employed.

The low and high refractive index polymerizable coating compositions may further comprise at least one difunctional (meth)acrylate monomer. Various difunctional (meth)acrylate monomers are known in the art, including for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, neopentyl glycol diacrylate, polyethylene glycol diacrylate, (Mn=200 g/mole, 400 g/mole, 600 g/mole), propoxylated neopentyl glycol diacrylate, tetraethylene glycol diacrylate, tricyclodecanedimethanol diacrylate, triethylene glycol diacrylate, and tripropylene glycol diacrylate.

The low refractive index layer preferably comprises one or more free-radically polymerizable materials having a fluorine content of at least 25 wt-%. Highly fluorinated monomer, oligomers, and polymers are characterized by having a low refractive index. Various fluorinated multi- and mono-(meth)acrylate materials having a fluorine content of at least about 25 wt-% are known. In some embodiments, the low refractive polymerizable composition has a fluorine content of at least 30 wt-%, at least 35 wt-%, at least 40 wt-%, at least 45 wt-%, or at least 50 wt-%. Typically, a major portion of the high fluorinated material is a multifunctional free-radically polymerizable material. However, such materials can be used in combination with fluorinated mono-functional materials.

Various fluorinated mono- and multi-(meth)acrylate compounds may be employed in the preparation of the polymerizable low refractive index coating composition. Such materials generally comprise free-radically polymerizable moieties in combination with (per)fluoropolyether moieties, (per)fluoroalkyl moieties, and (per)fluoroalkylene moieties. Within each of these classes are species having a high fluorine content, (e.g. of at least 25 wt-%). Other species within each class, having fluorine content less than 25 wt-%, can be employed as auxiliary components.

In some embodiments, such auxiliary fluorinated (meth) acrylate monomers can aid in compatibilizing the low refractive index or other fluorinated materials present in the reaction mixture. For example, perfluoropolyether urethane compounds have been found to be particularly useful for compatibilizing high fluorine containing materials such as described in Published U.S. Patent Application No. 2006/0216524; U.S. Pat. Nos. 7,718,264 and 7,537,828. Such perfluoropolyether urethane compounds generally include at least one polymerizable (e.g. terminal) (meth)acrylate moiety and at least one (optionally repeating) unit including a (per) fluoropolyether group bonded by means of a linking group having a valency of at least two to a urethane or urea linkage. The urethane and urea linkage is typically —NHC(O)X— wherein X is O, S or NR; and R is H or an alkyl group having 1 to 4 carbon. The perfluoropolyether moiety is preferably a HFPO— moiety, wherein HFPO is $F(CF(CF_3)CF_2O)aCF(CF_3)$— and "a" averages 2 to 15. In some embodiment "a" averages about 4 or 6. One exemplary high fluorine perfluoropolyether urethane(meth)acrylate is HFPO—C(O)NHC$_2$H$_4$OC(O)NHC$_2$H$_4$OC(O)C(CH$_3$)=CH$_2$, wherein In preferred embodiments, the low refractive index polymerizable composition comprises at least one free-radically polymerizable fluoropolymer. A general description and preparation of these classes of fluoropolymers can be found in Encyclopedia of Chemical Technology, *Fluorocarbon Elastomers*, Kirk-Othmer (1993), or in *Modern Fluoropolymers*, J. Scheirs Ed, (1997), J Wiley Science, Chapters 2, 13, and 32. (ISBN 0-471-97055-7).

Preferred fluoropolymers are formed from the constituent monomers known as tetrafluoroethylene ("TFE"), hexafluoropropylene ("HFP"), and vinylidene fluoride ("VDF," "VF2,"). The monomer structures for these constituents are shown below:

TFE: CF$_2$=CF$_2$ (1)

VDF: CH$_2$=CF$_2$ (2)

HFP: CF$_2$=CF—CF$_3$ (3)

The fluoropolymers preferably comprise at least two of the constituent monomers (HFP and VDF), and more preferably all three of the constituents monomers in varying molar amounts. Additional monomers not depicted in (1), (2) or (3) but also useful include perfluorovinyl ether monomers of the general structure CF$_2$=CF—OR$_f$, wherein R$_f$ can be a branched or linear perfluoroalkyl radical of 1-8 carbons and can itself contain additional heteroatoms such as oxygen. Specific examples are perfluoromethyl vinyl ether, perfluoropropyl vinyl ether, and perfluoro(3-methoxy-propyl) vinyl ether. Additional examples are found in Worm (WO 00/12574), assigned to 3M, and in Carlson (U.S. Pat. No. 5,214,100).

Amorphous copolymers consisting of VDF-HFP and optionally TFE are hereinafter referred to as FKM, or FKM elastomers as denoted in ASTM D 1418. FKM elastomers have the general formula:

wherein x, y and z are expressed as molar percentages. In some embodiments, x can be zero so long as the molar percentage of y is sufficiently high (typically greater than about 18 molar percent) to render the microstructure amorphous. Additional fluoroelastomer compositions useful in the present invention exist where x is greater than zero.

The fluoropolymer comprises free-radically polymerizable groups. This can be accomplished by the inclusion of halogen-containing cure site monomers ("CSM") and/or halogenated endgroups, which are interpolymerized into the polymer using numerous techniques known in the art. These halogen groups provide reactivity towards the other components of coating mixture and facilitate the formation of the polymer network. Useful halogen-containing monomers are well known in the art and typical examples are found in U.S. Pat. No. 4,214,060 to Apotheker et al., European Patent No. EP398241 to Moore, and European Patent No. EP407937B1 to Vincenzo et al.

Optionally halogen cure sites can be introduced into the polymer structure via the use of halogenated chain transfer agents which produce fluoropolymer chain ends that contain reactive halogen endgroups. Such chain transfer agents ("CTA") are well known in the literature and typical examples are: Br—CF$_2$CF$_2$—Br, CF$_2$Br$_2$, CF$_2$I$_2$, CH$_2$I$_2$. Other typical examples are found in U.S. Pat. No. 4,000,356 to Weisgerber. Whether the halogen is incorporated into the polymer microstructure by means of a cure site monomer or chain transfer agent or both is not particularly relevant as both result in a fluoropolymer which is more reactive towards UV crosslinking and coreaction with other components of the network such as the acrylates. An advantage to use of cure site monomers in forming the co-crosslinked network, as opposed to a dehydrofluorination approach (discussed below), is that the optical clarity of the formed polymer layer is not compromised since the reaction of the acrylate and the fluoropolymer does not rely on unsaturation in the polymer backbone in order to react. Thus, a bromo-containing fluoroelastomer such as Dyneon™ E-15742, E-18905, or E-18402 available from Dyneon LLC of St. Paul, Minn., may be used in conjunction with, or in place of, FKM as the fluoropolymer.

In another embodiment, the fluoropolymer can be rendered reactive by dehydrofluorination by any method that will provide sufficient carbon-carbon unsaturation of the fluoropolymer to create increased bonding between the fluoropolymer and a hydrocarbon substrate or layer. The dehydrofluorination process is a well-known process to induce unsaturation and it is used most commonly for the ionic crosslinking of fluoroelastomers by nucleophiles such as diphenols and diamines. This reaction is characteristic of VDF containing elastomers. A descriptions can be found in *The Chemistry of Fluorocarbon Elastomers*, A. L. *Logothetis, Prog. Polymer Science* (1989), 14, 251. Furthermore, such a reaction is also possible with primary and secondary aliphatic monofunctional amines and will produce a DHF-fluoropolymer with a pendent amine side group. However, such a DHF reaction is not possible in polymers which do not contain VDF units since they lack the ability to lose HF by such reagents.

Combinations of fluoropolymers rendered reactive by inclusion of a cure site monomer and fluoropolymers rendered reactive by dehydrofluorination can by employed. The fluoropolymer containing low refractive index composition described herein preferably comprise at least one amino organosilane ester coupling agent or a condensation product thereof as described in U.S. Publication No. 2006/0147723. Preferred amino organosilane ester coupling agent include 3-aminopropyltrimethoxysilane, 3-aminopropyltriethoxysilane, (aminoethylaminomethyl)phenethyltrimethoxysilane, (aminoethylaminomethyl)phenethyltriethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 4-aminobutyltrimethoxysilane, 4-aminobutyltriethoxysilane, 3-aminopropylmethyldiethoxysilane, 3-aminopropylmethyldimethoxysilane, 3-aminopropyldimethylmethoxysilane, 3-aminopropyldimethylethoxysilane, 2,2-dimethoxy-1-aza-2-silacyclopentane-1-ethanamine, 2,2-diethoxy-1-aza-2-silacyclopentane-1-ethanamine, 2,2-diethoxy-1-aza-2-silacyclopentane, 2,2-dimethoxy-1-aza-2-silacyclopentane, 4-aminophenyltrimethoxy silane, and 3-phenylaminopropyltrimethoxy silane.

In another embodiment, the low refractive index layer comprises the reaction product of a A) fluoro(meth)acrylate polymeric intermediate and B) at least one fluorinated (meth) acrylate monomer as described in U.S. Pat. No. 7,615,283. The mixture of A) and B) is preferably cured by exposure to (e.g. ultraviolet light) radiation. The cured low refractive index polymeric composition may comprise copolymerization reaction products of A) and B). The cured low refractive index polymeric composition is surmised to also comprise polymerization products of B). The fluoro(meth)acrylate polymer intermediate may covalently bond to other components within the low refractive index coating composition. Further, other optional components of the low refractive index coating, e.g. such as non-fluorinated crosslinker, may polymerize physically entangling the fluoro(meth)acrylate polymer intermediate thereby forming an interpenetrating network.

The A) fluoro(meth)acrylate polymeric intermediate comprises the reaction product of i) at least one fluorinated multi-(meth)acrylate monomer or oligomer having a fluorine content of at least about 25 wt-%; and ii) optionally one or more fluorinated or non-fluorinated multi-(meth)acrylate materials. The optional multi-(meth)acrylate material may include a monomer, oligomer, polymer, surface modified inorganic nanoparticles having multi-(meth)acrylate moieties, as well as the various combinations of such materials. The total amount of multi-(meth)acrylate materials is generally at least 25 wt-% based on wt-% solids of the polymerizable organic composition. The total amount of multi-(meth)acrylate materials may range from about 30 wt-% to 70 wt-% of the nanoparticle containing composition.

The low refractive index composition may comprise various monofunctional and/or multi-functional HFPO— perfluoropolyether compounds. The inclusion of at least about 5 wt-% to about 10 wt-% of these materials in the low refractive index layer can provide low energy surfaces having an initial static contact angle with water of at least 110°.

Various perfluoropolyether mono-(meth)acrylate compounds are known. One such exemplary low refractive index material is HFPO—C(O)NHCH$_2$CH$_2$OC(O)CH=CH$_2$, calculated to have 62.5 wt-% F. Other low refractive index perfluoropolyether mono-(meth)acrylate compounds that can be prepared in a similar manner are HFPO—C(O)NHCH$_2$CH$_2$OCH$_2$CH$_2$OCH$_2$CH$_2$OC(O)CH=CH$_2$ calculated to have 59.1 wt-% F, HFPO—C(O)NH(CH$_2$)$_6$OC(O)CH=CH$_2$ calculated to have 60.2 wt-% F, and HFPOC(O)NHCH$_2$CH$_2$OCH$_2$CH$_2$OCH$_2$CH$_2$OCH$_2$CH$_2$OC(O)CH=CH$_2$ calculated to have 57.3 wt-% F. Such compounds are described in U.S. patent application Ser. No. 11/277,162 filed Mar. 22, 2006 (See preparations 31a-31d).

An exemplary low refractive index perfluoropolyether multi-(meth)acrylate monomer is HFPO—C(O)N(H)CH$_2$CH(OC(O)CH=CH$_2$)CH$_2$OC(O)CH=CH$_2$, calculated to have a fluorine content of 53.4%. This monomer can be prepared as described in U.S. Patent Application Publication No. 2005/0249940-A1. (See FC-4). Other low refractive index multi-(meth)acrylate perfluoropolyether compounds include H$_2$C=CHC(O)OCH$_2$CH$_2$N(H)(O)C—HFPO—C(O)N(H)CH$_2$CH$_2$OC(O)CH=CH2, having 58.1% fluorine, and (H$_2$C=CHC(O)OCH$_2$)$_2$CH$_3$CH$_2$CN(H)(O)C—HFPOC(O)N(H)CCH$_2$CH$_3$(CH$_2$OC(O)CH=CH$_2$)$_2$ having 50.1% fluorine. These compounds can be prepared as described in the Published U.S. Patent Application No. 2006/0216524 and U.S. Pat. No. 7,718,264 (See Preparations No. 28. and 30).

At least one free-radical initiator is typically utilized for the preparation of the polymerizable low and high refractive coating compositions. Useful free-radical thermal initiators include, for example, azo, peroxide, persulfate, and redox initiators, and combinations thereof. Useful free-radical photoinitiators include, for example, those known as useful in the UV cure of acrylate polymers. In addition, other additives may be added to the final composition. These include but are not limited to resinous flow aids, photostabilizers, high boiling point solvents, and other compatibilizers well known to those of skill in the art.

The polymerizable compositions can be formed by dissolving the free-radically polymerizable material(s) in a compatible organic solvent at a concentration of about 1 to 10 percent solids. A single organic solvent or a blend of solvents can be employed. Depending on the free-radically polymerizable materials employed, suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

Although various fluorinated solvents could be employed, in one aspect compatible low refractive index coating compositions are prepared that are free of fluorinated solvents. Compatible coating compositions are clear, rather than hazy. Compatible coatings are substantially free of visual defects. Visual defects that may be observed when incompatible coating are employed include but are not limited to haze, pock marks, fisheyes, mottle, lumps or substantial waviness, or other visual indicators known to one of ordinary skill in the art in the optics and coating fields.

The method of forming an antireflective coating on an optical display or an antireflective film for use of an optical display may include providing a light transmissible substrate layer; providing a high refractive index material on the substrate layer; and providing the low index layer described herein coupled to the high refractive index layer. The low index layer may be provided by applying a layer of said low refractive index material onto said (e.g. cured) layer of said high refractive index material and irradiating with a sufficient ultraviolet radiation to crosslink. Alternatively, the low refractive index coating may be applied to a release liner, at least partially cured, and transfer coated onto the high index layer. Further, the antireflection material may be applied directly to the substrate or alternatively applied to a release layer of a transferable antireflection film and subsequently transferred from the release layer to the substrate using a thermal or radiation-induced transfer. Suitable transfer methods are described in Published U.S. Application No. 2006/0147614.

The low refractive index composition and high refractive index composition can be applied as a single or multiple layers to a high refractive index layer or directly to a (e.g. display surface or film) substrate using conventional film application techniques. Advantageously, a combination of low reflectance and good durability can be obtained with a single low refractive index layer provided on a single high refractive index layer.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Mod-* ern *Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

Although it is usually convenient for the substrate to be in the form of a roll of continuous web, the coatings may be applied to individual sheets.

The low refractive index as well as high refractive index coating composition are dried in an oven to remove the solvent and then cured for example by exposure to ultraviolet radiation using an H-bulb or other lamp at a desired wavelength, preferably in an inert atmosphere (less than 50 parts per million oxygen). The reaction mechanism causes the free-radically polymerizable materials to crosslink.

Figure 1:
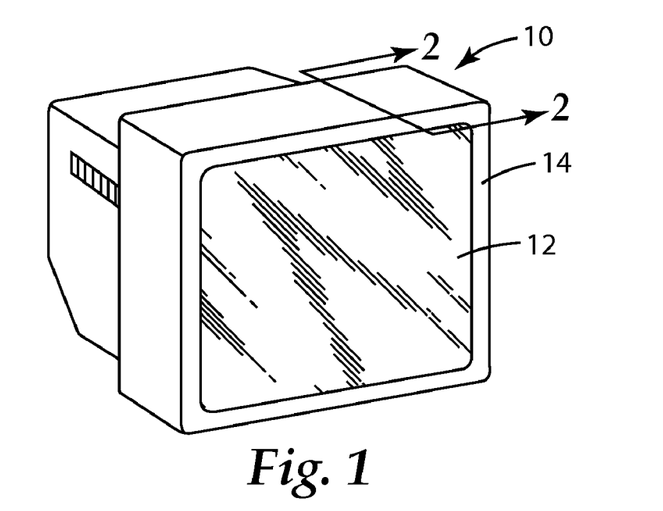
FIG. 1 is perspective view of an article having an optical display.

Referring now to FIG. 1, a perspective view of an article (here a computer monitor 10) having an optical display 12 disposed within a housing 14. The optical display 12 comprises a substantially transparent material through which a user can view text, graphics or other displayed information.

In the case of display panels, the display substrate 12 is light transmissive, meaning light can be transmitted through the display substrate 12 such that the display can be viewed. Both transparent (e.g. gloss) and matte light transmissive substrates 12 are employed in display panels. The display substrate 12 may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices.

Figure 2:
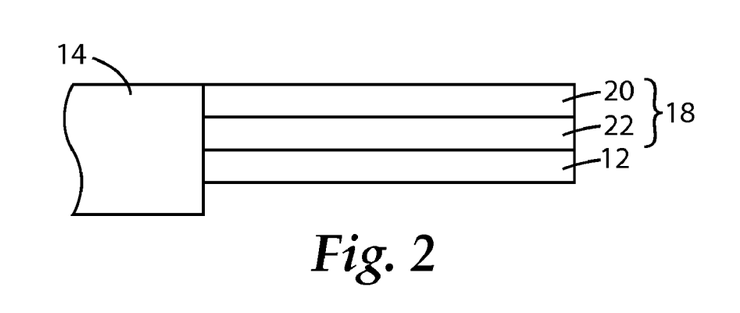
FIG. 2 is a sectional view of the article of FIG. 1 taken along line 2-2 illustrating an embodied antireflective film having a low refractive index layer.

With reference to FIG. 2, the optical display 12 includes an antireflection film 18 having at least one layer of a high refractive index layer 22 and a low refractive index layer 20. The low refractive index layer 20 is provided between the high refractive index layer and the viewing surface. Low refractive index layer 20 is typically a surface layer exposed to the environment, as depicted in FIG. 2.

The high refractive index layer has a refractive index of at least about 1.4, and typically at least about 1.5. The maximum refractive index of the high index layer is typically no greater than about 1.75 for coatings having high refractive index inorganic nanoparticles dispersed in a crosslinked organic material. The low refractive index layer has a refractive index less than a high refractive index layer. The difference in refractive index between the high refractive index layer and low refractive index layer is typically at least 0.10, or 0.15, or 0.2 or greater. The low refractive index layer typically has a refractive index of less than about 1.5, more typically of less than about 1.45, and even more typically less than about 1.42. The minimum refractive index of the low index layer is generally at least about 1.35.

Antireflective films preferably have an average reflectance of less than 3%, 2%, or 1% at 450 nm to 650 nm as measured with a spectrophotometer as described in the examples.

Figure 3:
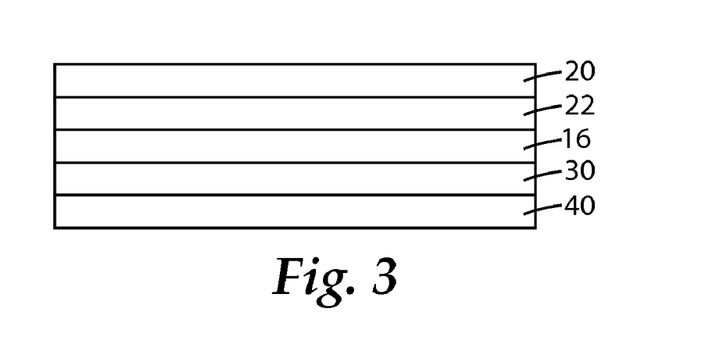
FIG. 3 is an embodied antireflective film article.

With reference to FIG. 3, an embodied antireflective film article typically comprises a light transmissive substrate 16. The substrate 16 as well as the antireflective film typically have a transmission of at least 80%, at least 85%, and preferably at least 90%.

The high refractive index layer 22 is disposed between the film substrate 16 and low refractive index layer 20.

The antireflective film may comprise other layers. Various permanent and removable grade adhesive compositions 30 may be provided on the opposite side of the film substrate 16. For embodiments that employ pressure sensitive adhesive, the antireflective film article typically include a removable release liner 40. During application to a display surface, the release liner is removed so the antireflective film article can be adhered to the display surface.

Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

The antireflective film substrate 16 is selected based in part on the desired optical and mechanical properties such as flexibility, dimensional stability and impact resistance. Substrate 16 may comprise any of the same thermoplastic and crosslinked polymeric materials as optical display 12. Substrate 16 may also comprise or consist of polyamides, polyimides, phenolic resins, polystyrene, styrene-acrylonitrile copolymers, epoxies, and the like. In addition, the substrate 16 may comprise a hybrid material, having both organic and inorganic components. The film substrate 16 thickness typically also will depend on the intended use. For most applications, the substrate thicknesses is preferably less than about 0.5 mm, and more preferably about 0.02 to about 0.2 mm. Self-supporting polymeric films are preferred. The polymeric material can be formed into a film using conventional film-making techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films suitable for use as the film substrate are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150, Jan. 29, 2004.

As described in U.S. Patent Application Publication No. 2003/0217806 multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

In order to reduce or eliminate optical fringing within the high refractive index layer it is preferred that the antireflective film substrate has a refractive index close to that of the high refractive index layer, i.e. differs from the high refractive index layer by less than 0.05, and more preferably less than 0.02. Alternatively, optical fringing can be eliminated or reduced by providing a high index primer on the film substrate, the primer being chosen to closely match the refractive index of the high refractive index layer and substrate. However, when the substrate has a low refractive index, the difference in refractive index between the high refractive index layer and the substrate can range from about 0.05 to 0.10 and greater. For this embodiment, it is not possible to concurrently match the refractive index of the primer to both the high refractive index layer and the (i.e. low refractive index) substrate. In this embodiment, optical fringing is reduced or eliminated by formulating the primer to have a refractive index intermediate (i.e. median+/−0.02) between the low refractive index substrate and the high refractive index layer.

In one embodiment, a primer coating is applied to either the display substrate surface, film substrate, or hardcoat layer applied to either the display substrate or film substrate. One preferred primer coating material for use in these constructions is available from Sumitomo Osaka Cement under the trade designation "Sumicefine TM-AS-1". This material is an aqueous dispersion containing conductive antimony tin oxide nanoparticles and a polyester binder. When coated on a substrate film such as PET, it yields a high-refractive index coating (RI~1.67) that closely matches the refractive index of the high-index hardcoat applied as the next layer. This can reduce interference fringing due to index mismatches with a conventional acrylate primer. The primer can also improve adhesion of the high-index hardcoat to the PET substrate film, relative to uncoated PET film. Finally, the antimony tin oxide nanoparticles provide good antistatic performance (static charge decay times 0.01-0.02 sec) after application of the high-index hardcoat.

Various other antistatic materials may be incorporated in the antireflective films described herein such as described in U.S. Pat. No. 8,092,904 and provisional application Nos. 60/804,784, filed Jun. 14, 2006, 60/804,787, filed Jun. 14, 2006 and U.S. Publication No. 2007/0292679.

The antireflective films described herein are suitable for application to optical displays ("displays"). The displays include various illuminated and non-illuminated display panels. Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches.

The antireflective film can be employed with a variety of portable and non-portable information display articles. These articles include, but are not limited to, PDAs, LCD-TV's (both edge-lit and direct-lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, and instrument panel covers. These devices can have planar or curved viewing faces.

The antireflective material can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, overhead projectors, stereo cabinet doors, stereo covers, watch covers, as well as optical and magneto-optical recording disks, and the like.

The antireflective film may also be applied to a variety of other articles including (e.g. retroreflective) signage and commercial graphic display films employed for various advertising, promotional, and corporate identity uses.

While the invention has been described in terms of preferred embodiments, it will be understood, of course, that the invention is not limited thereto since modifications may be made by those skilled in the art, particularly in light of the foregoing teachings.

Surface Testing Methods of Antireflective Films

Contact Angle—The surface of the cured low refractive index layer was rinsed for 1 minute by hand agitation in IPA before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops. Static contact angles were measured by suspending a water droplet from the needle tip of the dispensing syringe, then bringing the substrate surface to be measured up to the drop until the drop detached from the needle and was transferred to the surface. The drop image was then captured and the contact angle measured by image analysis. Advancing and receding contact angles were measured by adding (for advancing) or withdrawing (for receding) liquid from a droplet already in contact with the surface, and capturing the drop image as the liquid front advanced or receded across the substrate surface. Drop volumes were 5 μL for static measurements and 1-3 μL for advancing and receding. For hexadecane, only advancing and receding contact angles are reported because in most cases static and advancing values were found to be nearly equal.

Haze and Transmission Measurements:

Haze and transmission measurements were collected by means of a BYK-Gardner haze meter (BYK-Gardner USA, Columbia, Md.).

Average % Reflectance (% R):

The Average % Reflectance of the first (i.e. front) surface of the cured films was measured using a Shimadzu UV-3101PC UN-VIS-NIR Scanning Spectrophotometer with the machine extension, MPC 3100, available from Shimadzu Co., Japan and Shimadzu Scientific Instruments, Columbia, Md. One sample of each film was prepared by applying Yamato Black Vinyl Tape #200-38 (obtained from Yamato International Corporation, Woodhaven, Mich.) to the backside of the sample. The black tape was laminated to the backside of the sample using a roller to ensure there were no air bubbles trapped between the black tape and the sample. To measure the first surface reflection, the sample was placed in the Shimadzu Spectrophotometer so that the non-tape side was against the aperture. The presence of the black tape eliminates back surface reflections. The Reflectance was measured at a 12° incident angle between the wavelengths of 360 to 800 nm and the Average % Reflectance was calculated for the wavelength range of 450-650 nm. Each sample was measured before and after steel wool testing.

Steel Wool Testing: The abrasion resistance of the cured films was tested cross-web to the coating direction by use of a mechanical device capable of oscillating a steel wool sheet adhered to stylus across the film's surface. The stylus oscillated over a 60 mm wide sweep width at a rate of 210 mm/sec (3.5 wipes/sec) wherein a "wipe" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape.

Ingredients Employed in the Examples

"HFPO—", as used in the Examples, unless otherwise noted, refers to the end group $F(CF(CF3)CF2O)_aCF(CF3)-$ of the methyl ester $F(CF(CF3)CF2O)_aCF(CF3)C(O)OCH3$, wherein a averages about 6.22, with an average molecular weight of 1,211 g/mol. It was prepared according to the method reported in U.S. Pat. No. 3,250,808 (Moore et al.), with purification by fractional distillation.

$HFPO—C(O)N(H)CH_2CH_2CH_2N(H)CH_3$ was prepared according to the procedure found in US Published Application No. 2005/0250921A1, Preparation FC1/AM1.

Multi-Functional Free-Radically Polymerizable Materials Having High Fluorine

1. HFPO-TMPTA refers to the Michael's adduct of $HFPO—C(O)N(H)CH_2CH_2CH_2N(H)CH_3$ (FC1/AM1) with trimethylolpropane triacrylate (TMPTA). This adduct was made as described in US Published Application No. 2005/0250921, Example 1, as the preparation of an approximately 1:1 molar ratio adduct of FC1/AM1 with AC-1(TMPTA) or FC1/AM1/AC-1. This adduct has 52.02 wt-% fluorine and nominal Mn of 1563 g/mole.

2. C6DIACRY is the trade designation for 2,2,3,3,4,4,5,5-octafluoro-1,6-hexanediol diacrylate (commonly referred to as 8F-HDDA), having a molecular weight of 370.2 g/mole and at least 40 wt-% fluorine was obtained from Exfluor Research Corporation, of Round Rock, Tex.

3. CN 4000 was obtained from Sartomer Company, Exton, Pa.

4. Br-FKM (E18402) is a free-radically polymerizable amorphous terpolymer of tetrafluoroethylene (TFE), vinylidene fluoride (VDF) and hexafluoropropylene (HFP), and a halogen-containing cure site monomer having 70 wt. % fluorine, and available from Dyneon LLC of Oakdale, Minn.

A1106 is the trade designation for 3-aminopropyltrimethoxysilane, manufactured by Osi Specialties (GE Silicones) of Paris, France.

Darocur 1173 is the trade designation for 2-hydroxy-2-methyl-1-phenyl-1-propanone, a UV photoinitiator, and was obtained from Ciba Specialty Products, of Tarrytown, N.Y., and used as received.

Irgacure 184 is the trade designation for 1-hydroxy-cyclohexylphenyl ketone, and was obtained from CIBA Specialty Chemicals, of Tarrytown, N.Y.

HMDS is the trade designation for hexamethydisilizane available from Aldrich Co.

KB-1 is the trade designation for benzyl dimethyl ketal UV photoinitator obtained from Sartomer Company of Exton, Pa. and was used as received.

Nalco 2327 is the trade designation for an aqueous dispersion of 20 nm silica nanoparticles (41% solids in water, stabilized with ammonia), and was obtained from Nalco Chem. Co., of Naperville, Ill.

Prostab 5198 is the trade designation for 4-hydroxy-2,2,6,6-tetramethyl-1-piperidinyloxy (commonly referred to as 4-hydroxy-TEMPO), and was obtained from CIBA Specialty Chemicals, of Tarrytown, N.Y.

3-methacryloxypropyltrimethoxysilane is available from Alfa Aesar, Ward Hill, Mass. (Stock #30505) and was used as received.

SR399 is the trade designation for dipentaerythritol pentaacrylate (molecular weight of 525 g/mole), a non-fluorinated multifunctional (meth)acrylate monomer obtained from Sartomer Company, of Exton, Pa.

Vazo 52 is the trade designation for 2,2',-azobis(2,4-dimethylpentane nitrile), a thermal free-radical initiator obtained from DuPont, of Wilmington, Del.

$ZrO_2$ sols (40.8% solids in water) was prepared were prepared in accordance with the procedures described in published U.S. Patent Application No. 2006/0204745. The resulting $ZrO_2$ sols were evaluated with Photo Correlation Spectroscopy (PCS), X-Ray Diffraction and Thermal Gravimetric Analysis as described in published U.S. Patent Application No. 2006/0204745. The $ZrO_2$ sols used in the examples had properties in the ranges that follow:

| | PCS Data | | | |
| --- | --- | --- | --- | --- |
| Dispersion Index | Intensity avg size (nm) | Volume-avg size (nm) | (Intensity-avg)/ (Volume-avg) | |
| 1.0-2.4 | 23.0-37.0 | 8.0-18.8 | 1.84-2.97 | |

| Relative Intensities | | Apparent Crystallite Size (nm) | | | | | Weighted |
| --- | --- | --- | --- | --- | --- | --- | --- |
| Cubic/ Tetragonal | Monoclinic | (C, T) (1 1 1) | M (−1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

Surface Modified Zirconia Nanoparticles 20.4 lbs of an aqueous dispersion of 10 nm zirconia nanoparticles (40.8% solids in water) was added to a 10 gallon reactor. 12.9 lbs additional water and 33.3 lbs 1-methoxy-2-propanol were added to the reactor with stirring. 2.5 lbs of 3-methacryloxypropyltrimethoxysilane was added slowly to the reactor with stirring. 0.021 lbs of a 5% solution in water of Prostab 5198 was added to the reactor with stirring. The mixture was stirred 18 hours at 80° C.

The reaction mixture was heated under vacuum (24-40 torr) and the 1-methoxy-2-propanol/water azeotrope was distilled off to remove substantially all of the water, while slowly adding 70.5 lbs of additional 1-methoxy-2-propanol. 0.4 lbs of 30% ammonium hydroxide was added to the reaction mixture, then the reaction was concentrated to 59.2% solids by distilling off 1-methoxy-2-propanol. The surface modification reaction resulted in a mixture containing 59.2% surface modified zirconia ($ZrO_2$—SM), by weight, in 1-methoxy-2-propanol. The final mixture was filtered through a 1 micron filter.

High Refractive Index Formulation

A hardcoat formulation was prepared, as follows, as the High Refractive Index Formulation. 246.6 grams 2-butanone (EMD Chemicals), 94.1 grams SR399, and 16.1 grams Irgacure 184 were added to a 2-L amber jar. The mixture was shaken until homogenous. 735.1 grams of $ZrO_2$—SM (59.2% solids in 2-methoxy-1-propanol) was added slowly to the mixture and gently mixed until homogenous. This results in a composition containing 50 wt-% solids. The final mixture was filtered through a 0.5 micron filter.

Surface Modified Silica Nanoparticle Dispersion for Low Refractive Index Formula 1

305 grams of Nalco 2327 was added to a 1-liter reaction flask. 486 grams of 1-methoxy-2-propanol was added to the reactor with stirring. 19.38 grams of 3-methacryloxypropyltrimethoxysilane was added slowly to the reactor with stirring. 0.15 grams of a 5% aqueous of Prostab 5198 was added to the reactor with stirring. The mixture was stirred 18 hours at 90° C.

The reaction mixture was heated under vacuum and the 1-methoxy-2-propanol/water azeotrope was distilled off with any necessary addition of 1-methoxy-2-propanol to remove substantially all of the water. The surface modification reaction resulted in a mixture containing 40% surface modified silica (20 nm average particle size), by weight, in 1-methoxy-2-propanol.

Surface Modified Silica Nanoparticles for Low Refractive Index Formulations 2-4

15 g of 2327 (20 nm ammonium stabilized colloidal silica sol, 41% solids; Nalco, Naperville, Ill.) were placed in a 200-ml glass jar. A solution of 10 g of 1-methoxy-2-propanol (Aldrich) containing 0.47 g of 3-(trimethoxysilyl)propylmethacrylate (Gelest, Inc., Tullytown, Pa.) was prepared in a separate flask. The 3-(trimethoxysilyl)propylmethacrylate solution was added to the glass jar while the silica sol was stirred. The flask was then rinsed with an additional 5 ml of solvent and added to the stirred solution. After complete addition, the jar was capped and placed in an oven at 90° C. for about 20 hours. The sol was then dried by exposure to gentle airflow at room temperature. The powdery white solid was collected and dispersed in 50 ml of tetrahydrofuran (THF) solvent. 2.05 g of HMDS (excess) were slowly added to the THF silica sol, and, after addition, the jar was capped and placed in an ultrasonic bath for about 10 hours. Subsequently, the organic solvent was removed by a rotovap and the remaining white solid heated at 100° C. overnight for further reaction and removal of volatile species.

Fluoroacrylate Polymer Intermediate 1

A hyperbranched copolymer was made as follows. 17.01 grams of C6DIACRY, 8.51 grams of CN4000, 2.84 grams of SR399, 1.70 grams of HFPO-TMPTA, 241.02 grams of ethyl acetate, 25.52 grams of methyl ethyl ketone, and 3.40 grams of Vazo 52 predissolved in the methyl ethyl ketone were charged into a reaction vessel. It is preferable to add the HFPO-TMPTA to the CN4000 first, then the remaining reagents.

The contents of the reaction vessel were degassed under nitrogen, and then heated 80° C. in a sealed bottle for 1 to 1.5 hours. Care must be taken to avoid building an excessive molecular weight and gelling the reaction contents. The concentration of the reactive species in the reaction mixture, the temperature of the reaction, and the reaction time were all selected to ensure this result, and one or more of these would need to be adjusted if different reactive species were used.

Fluorinated Acrylate Monomer

A monomer mixture solution, incorporating a fluorinated acrylate monomer, was prepared as follows. 39.79 grams of C6DIACRY, 13.14 grams of CN4000, 22.52 grams of SR399, a sufficient amount of the surface modified silica nanoparticle dispersion to yield 45.05 grams solids (the silica dispersions typically had 35-55% solids after the azeotrope removal), and 4.50 grams of Darocur 1173 (a photoinitiator), were each separately dissolved in methyl ethyl ketone to yield 10% by weight solutions or dispersions. The first three solutions were then blended in the order indicated so that the monomers were well-blended before addition to the silica nanoparticles and the Darocur 1173 was added last.

Low Refractive Index Formulation 1

1250 grams of the Fluorinated Acrylate Monomer composition was placed in a container and 300 grams the Fluoroacrylate Polymer Intermediate composition having 10% solids concentration was carefully added with thorough mixing to avoid aggregation of the silica. Coating of the Low Refractive Index Formulation was performed within one week of this preparation.

| Low Refractive Index Formulations 2-4 | | | | | | |
|---|---|---|---|---|---|---|
| Formulation | Br-FKM (E18402) | Surface Modified Silica Nanoparticles | SR 399 | A1106 | KB-1 | Wt % F in Coating |
| 2 | 35 | 40 | 20 | 5 | 1.5 | 24.5 |
| 3 | 55 | 10 | 30 | 5 | 1.5 | 38.0 |
| 4 | 50 | 15 | 30 | 5 | 1.5 | 34.5 |

Preparation of Antireflective Films

Coating and Curing the High Refractive Index Layer

The High Refractive Index Formulation containing the zirconia nanoparticles (optionally filtered through a 1 micron filter followed by a 0.2 micron filter) was coated onto either the primed surface of a 5 mil PET film (obtained from Dupont under the trade designation "Melinex 618") or 7 mil Polycarbonate film (obtained from GE, Mount Vernon, Ind.). The solution was syringe-pumped into a 4 inch wide coating die, and the coating was dried by passing through two 10 foot ovens each set at 120° C. The coating on the primed PET was then partially cured with a Light Hammer 6 UV source (Fusion UV Systems, Inc., Gaithersburg, Md.), at 50% power. The resulting partially cured high refractive index layer was approximately 4 microns thick. The coating on the PC was fully cured with the Light Hammer 6 UV source set at 100% power, under Nitrogen. The resulting fully cured high refractive index layer was approximately 4 microns thick. Further details of the process conditions are included in the table below.

| Substrate | Line Speed (fpm) | Syringe Flow Rate (cc/min) | Oxygen (ppm) | Bulb | % UV | Oven (C.) | Oven (C.) |
|---|---|---|---|---|---|---|---|
| Polycarbonate | 30 | 16.20 | 2.11 | H | 100% | 120 | 120 |
| Primed PET | 30 | 16.20 | 1.23 | H | 50% | 120 | 120 |

Measurement of the UV output of the UV lamp at 100% UV at a line speed of 10 feet/per/minute resulted in the following energy and power readings for the UV A, B, C, and V regions.

| UV-A | UV-B | UV-C | UV-V | Units |
|---|---|---|---|---|
| 1.63 | 1.60 | 0.21 | .99 | W/cm$^2$ |
| 1.01 | 0.94 | 0.14 | 0.60 | J/cm$^2$ |

Accordingly, the coated polycarbonate substrate was exposed to ⅓ such UV energy; whereas the coated PET substrate was exposed to ⅙ of such UV energy.

Coatings of Low Refractive Index Formulations 1 and 2 were formed with a web coater onto the fully cured high refractive index layer on polycarbonate. Coatings of Low Refractive Index Formulations 3 and 4 were formed with the web coater onto the partially cured high refractive index layer on primed polyester. It is desired to have a first-order minimum in the reflection curve close to the design wavelength of 550 nm. In order to achieve this, the low index coating is targeted to have a dried thickness of 90-100 nm.

The Low Index Refractive Index Formulations were syringe-pumped into a 4 inch wide coating die, and the coating was dried by passing through a 10 foot oven set at 120° C. The coatings were then cured with a Light Hammer 6 UV source (Fusion UV Systems, Inc., Gaithersburg, Md.), at 100% power, under Nitrogen. Measurement of the UV output of the UV lamp resulted in the same energy and power readings for the UV A, B, C, and V regions as described above. The resulting cured Low Refractive Index layer was approximately 90 to 100 nanometers thick. Further details of the process conditions are included as follows.

| Low Refractive Index Composition | % solids | Line Speed (fpm) | Syringe Flow Rate (cc/min) | Oxygen in UV Chamber (ppm) | Bulb | % UV | Oven (C.) | Oven (C.) |
|---|---|---|---|---|---|---|---|---|
| 1 | 10 | 5 | 0.65 | 0.99 | H | 100% | 60 | 60 |
| 2 | 5 | 5 | 0.9 | | H | 100% | 120 | 120 |
| 3 | 5 | 5 | 0.9 | | H | 100% | 120 | 120 |
| 4 | 5 | 5 | 0.8 | 1.22 | H | 100% | 120 | 120 |

The four antireflective film samples were evaluated for % Haze, % Transmission, Contact Angle and Average % Reflection according to the test methods described above. The samples were then evaluated according to the Steel Wool Durability Test Method using a 1 kg weight after which their % Haze, Contact Angle and Average % Reflection were measured again. The results are recorded as follows.

| Low RI Formulation | % T | % Haze | % Haze after Steel Wool Test | % R Avg 450-650 nm after Steel Wool Test | Initial Water Contact Angle (S/A/R) | Initial Hexadecane Contact Angle (A/R) | Contact Angle after Steel Wool Test |
|---|---|---|---|---|---|---|---|
| 1 | | 0.20 | 0.35 | 1.63 | | 61/55 | 64/53 |
| 2 | 93.2 | 0.42 | 0.38 | 1.85 | 97/113/77 | 50/35 | 48/35 |
| 3 | 93.7 | 0.60 | 0.58 | 1.65 | 92/114/76 | 51/40 | 51/38 |
| 4 | 93.4 | 0.57 | 0.69 | 1.92 | 98/111/74 | 50/37 | 51/31 |

Preparation of Antireflective Film with Primed Substrate

An antireflective film was prepared in a similar manner with Low Refractive Index Composition 1. Unprimed PET (obtained from DuPont) was first coated with a composition obtained from Sumitomo Osaka Cement under the trade designation "Sumicefine TM-AS-1". This material is a dispersion of antimony tin oxide nanoparticles and a polyester binder in a mixed aqueous/organic solvent system, with total solids content determined to be 6.34 wt % by gravimetry. Coating formulations were prepared by dilution of the Sumicefine TM-AS-1 with deionized water to 3.17 wt-% solids ("Primer 1") and 1.27 wt-% solids ("Primer 2"). Primer 2 also contained 0.1 wt % of Tomadol 25-9 nonionic surfactant. Each of the formulations were coated on the PET and dried at 125° C. to provide primer layers with nominal dry film thickness of 115 nm for Primer 1 and 40 nm for Primer 2. The high refractive index coating was then coated on the primer and the low refractive index layer applied to the high refractive index layer as previously described.

The surface resistivities of the samples were then measured on a ProStat (Bensenville, Ill.) PRS-801 surface resistance meter. Static charge decay times were measured on the samples using an Electro-Tech Systems, Inc. (Glenside, Pa.) Model 406C static decay meter. This instrument charges the sample to +5 kV or −kV and measures the time required for the static charge to decay to 10% of its initial value. Results were as follows:

| | Static Decay Time (seconds) | Surface Resistivity (ohm/sq) |
|---|---|---|
| Antireflective Film 1 | 20-30 sec. | >1.1 × 10$^{14}$ |
| With Primer 1 | 0.01 sec | 4.0 × 10$^{11}$ |
| With Primer 2 | 0.01 sec | 3.9 × 10$^{11}$ |

The results show that the antistatic primer continues to provide antistatic properties even when a high refractive index layer and low refractive index layer are each coated over the antistatic primer.

The antireflective film having Primer 1 and 2 were each evaluated according to the steel wool durability test and no scratches were observed after 300 wipes. Ink repellency after steel wool wear was nearly unchanged from before the test.

What is claimed is:

1. An antireflective film comprising
   a low refractive index layer comprising the reaction product of a polymerizable composition comprising
      at least one free-radically polymerizable fluoropolymer,
      at least one amino organosilane ester coupling agent or condensation product thereof,
      at least one non-fluorinated crosslinker having at least three free-radically polymerizable groups, and
      surface modified inorganic nanoparticles;

a high refractive index layer having a thickness of at least 1 micron coupled to the low refractive index layer wherein the high refractive index layer is selected from an inorganic material having a refractive index of at least 1.60 or a crosslinked organic material comprising surface modified inorganic oxide particles.

2. The antireflective film composition of claim 1, wherein the free-radically polymerizable fluoropolymer comprises an amorphous fluoropolymer.

3. The antireflective film of claim 2 wherein the amorphous fluoropolymer is selected from the group consisting of a Cl-containing fluoroelastomer, a Br-containing fluoroelastomer, an I-containing fluoroelastomer, and a C=C containing fluoroelastomer.

4. The antireflective film of claim 1 wherein the amino organosilane ester coupling agent or condensation product thereof is selected from the group consisting of 3-aminopropyltrimethoxysilane, 3-aminopropyltriethoxysilane, (aminoethylaminomethyl)phenethyltrimethoxysilane, (aminoethylaminomethyl)phenethyltriethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 4-aminobutyltrimethoxysilane, 4-aminobutyltriethoxysilane, 3-aminopropylmethyldiethoxysilane, 3-aminopropylmethyldimethoxysilane, 3-aminopropyldimethylmethoxysilane, 3-aminopropyldimethylethoxysilane, 2,2-dimethoxy-1-aza-2-silacyclopentane-1-ethanamine, 2,2-diethoxy-1-aza-2-silacyclopentane-1-ethanamine, 2,2-diethoxy-1-aza-2-silacyclopentane, 2,2-dimethoxy-1-aza-2-silacyclopentane, 4-aminophenyltrimethoxy silane, and 3-phenylaminopropyltrimethoxy silane.

5. The antireflective film of claim 1 wherein the antireflective film surface has an advancing contact angle with hexadecane of at least 45 degrees.

6. The antireflective film of claim 1 wherein the high refractive index layer has a thickness of about 1 micron to about 10 microns.

7. The antireflective film of claim 1 wherein the low refractive index layer has an optical thickness of about ¼ wave.

8. The antireflective film of claim 1 wherein the antireflective film is free of additional hardcoat layers.

9. The antireflective film of claim 1 wherein the low refractive index layer is substantially free of inorganic particles having a diameter of greater than 1 micron.

10. The antireflective film of claim 1 wherein the free-radically polymerizable fluoropolymer has a fluorine content of at least 25 wt-%.

11. The antireflective film of claim 10 wherein the amount of free-radically polymerizable fluoropolymer having a fluorine content of at least 25 wt-% is at least 25 wt-% of the polymerizable low refractive index composition.

12. The antireflective film of claim 1 wherein the low refractive index polymerizable composition further comprises at least one monofunctional HFPO-fluoropolyether, at least one multifunctional HFPO-fluoropolyether, and mixtures thereof.

13. The antireflective film of claim 1 wherein the high refractive index layer comprises at least 5 vol-% surface modified zirconia.

14. The antireflective film of claim 1 wherein the high refractive index layer comprises at least 15 vol-% to 40 vol-% of surface modified zirconia.

15. The antireflective film of claim 1 wherein the surface modified particles comprise free-radically polymerizable groups selected from acryl groups, methacryl group, and vinyl groups.

16. The antireflective film of claim 1 wherein the high refractive index layer is coupled to a light transmissive substrate.

17. The antireflective film of claim 16 wherein the substrate comprises a primed surface.

18. The antireflective film of claim 7 wherein the primed surface comprises a primed layer having a refractive index that differs from the substrate by less than 0.02 and comprises inorganic oxide nanoparticles having a refractive index of at least 1.60.

19. The antireflective film of claim 18 wherein the inorganic oxide nanoparticles are antistatic particles.

20. The antireflective film of claim 1 wherein the antireflective film has a haze of less than 1.0% after 25 wipes with steel wool using a 3.2 cm mandrel and a mass of 1000 grams.

21. The antireflective film of claim 1 wherein the antireflective film comprises a single low refractive index layer.

22. An optical device comprising the antireflective film of claim 1.

* * * * *

UNITED STATES PATENT AND TRADEMARK OFFICE
CERTIFICATE OF CORRECTION

PATENT NO. : 8,343,624 B2
APPLICATION NO. : 13/365313
DATED : January 1, 2013
INVENTOR(S) : Christopher B. Walker, Jr. et al.

Page 1 of 1

It is certified that error appears in the above-identified patent and that said Letters Patent is hereby corrected as shown below:

Title Page, Column 1 (Related U.S. Application Data)
Line 3, Delete "continuation" and insert -- continuation-in-part --, therefor.

Title Page, Column 2 (Other Publications)
Line 3, Delete "Drivatives" and insert -- Derivatives --, therefor.

Title Page, Column 2 (Abstract)
Line 2, Delete "a the" and insert -- the --, therefor.

In the Specifications:

Column 3
Line 59, Delete "Collodial" and insert -- Colloidal --, therefor.
Line 65, Delete "CAB-O-" and insert -- "CAB-O- --, therefor.

Column 9
Line 2, Delete ", wherein" and insert -- . --, therefor.

Column 10
Line 37, Delete "can by" and insert -- can be --, therefor.

Column 15
Line 65, Delete "tubes" and insert -- diodes --, therefor.

Column 18
Line 20, Delete "hexamethydisilizane" and insert -- hexamethyldisilazane --, therefor.
Line 23, Delete "photoinitator" and insert -- photoinitiator --, therefor.

Signed and Sealed this
Thirtieth Day of April, 2013

Teresa Stanek Rea
*Acting Director of the United States Patent and Trademark Office*